June 2, 1931.  S. DEBUS  1,807,688
DOUGHPROOFING APPARATUS
Filed July 6, 1928  4 Sheets-Sheet 1
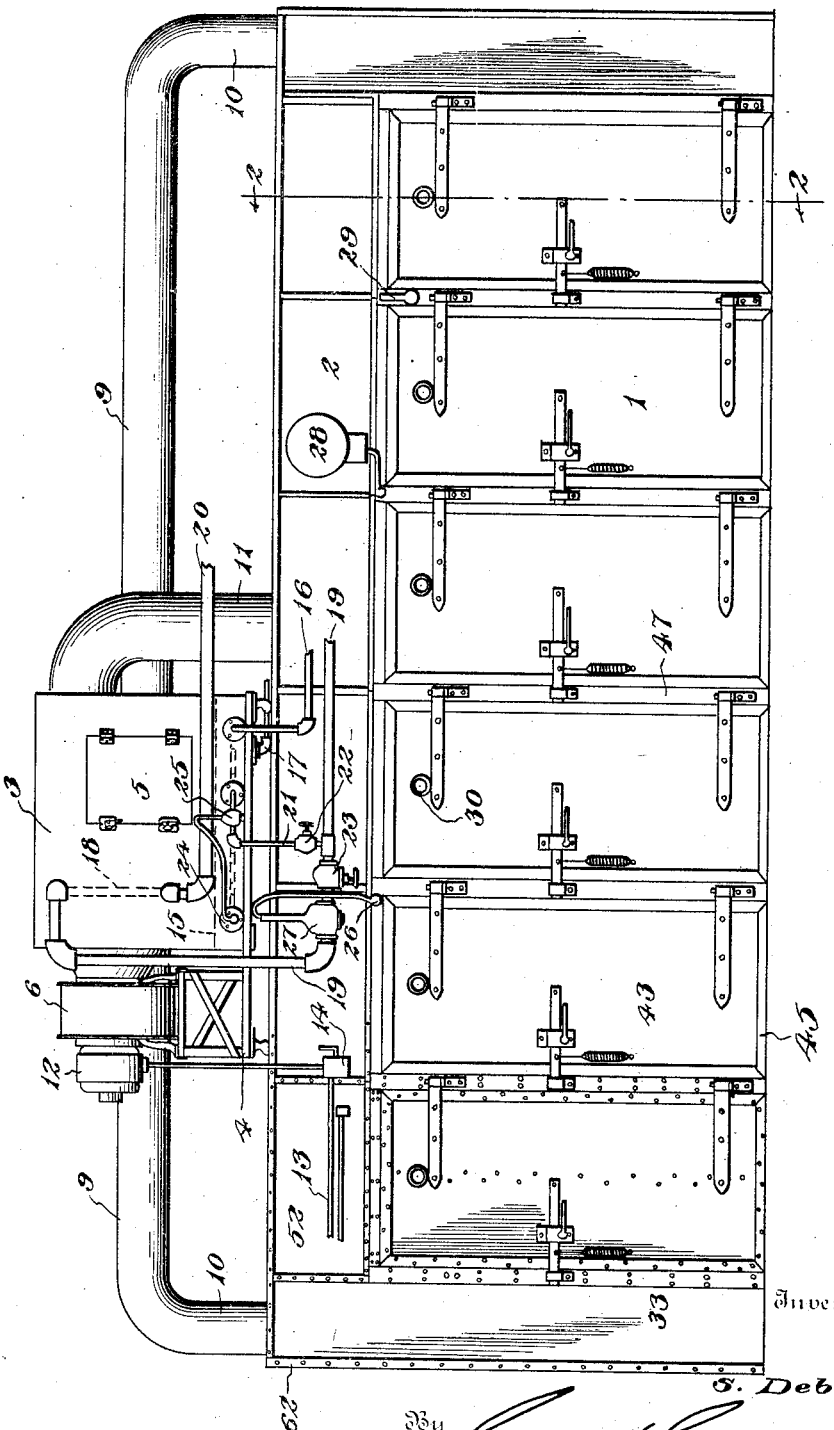

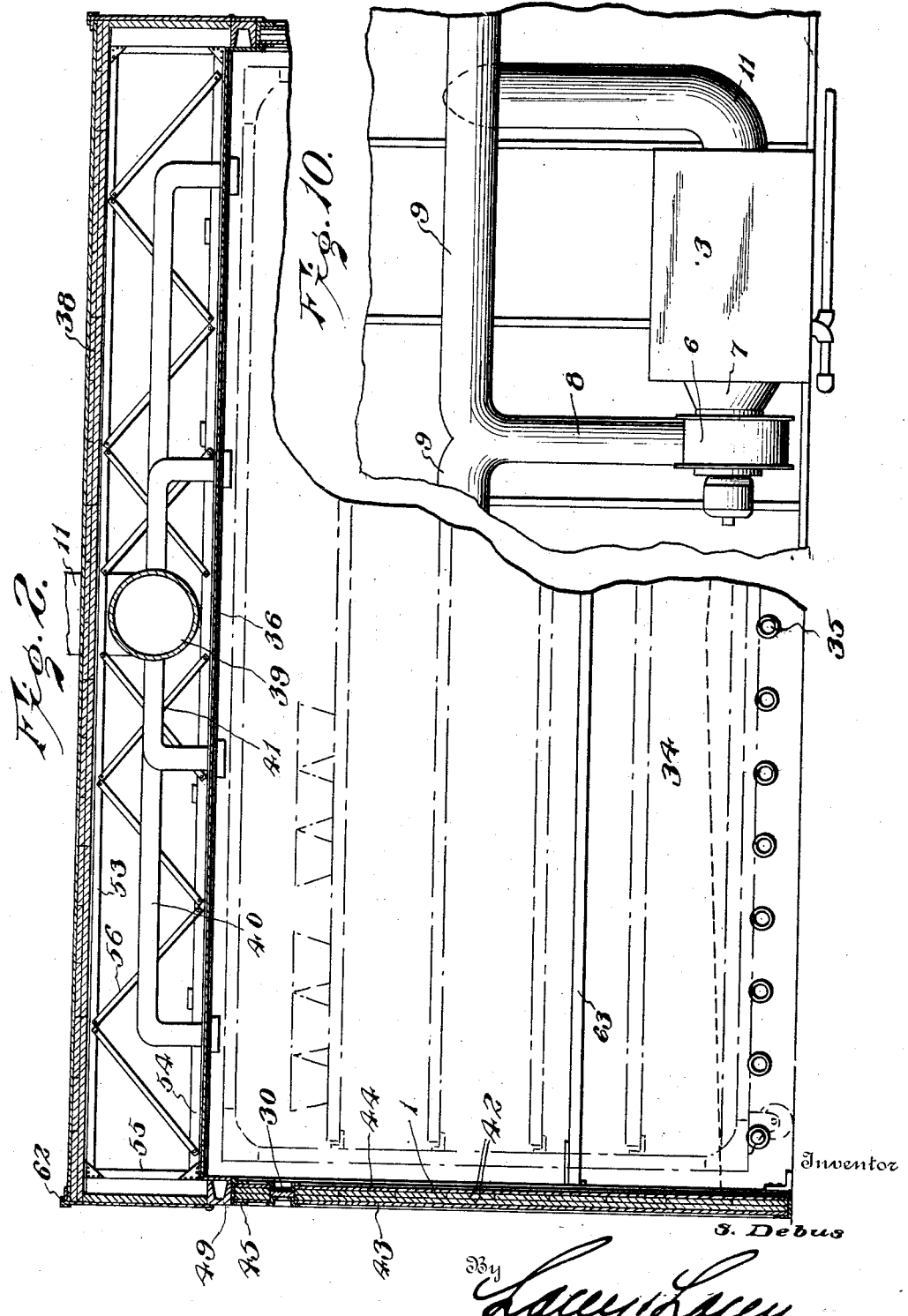

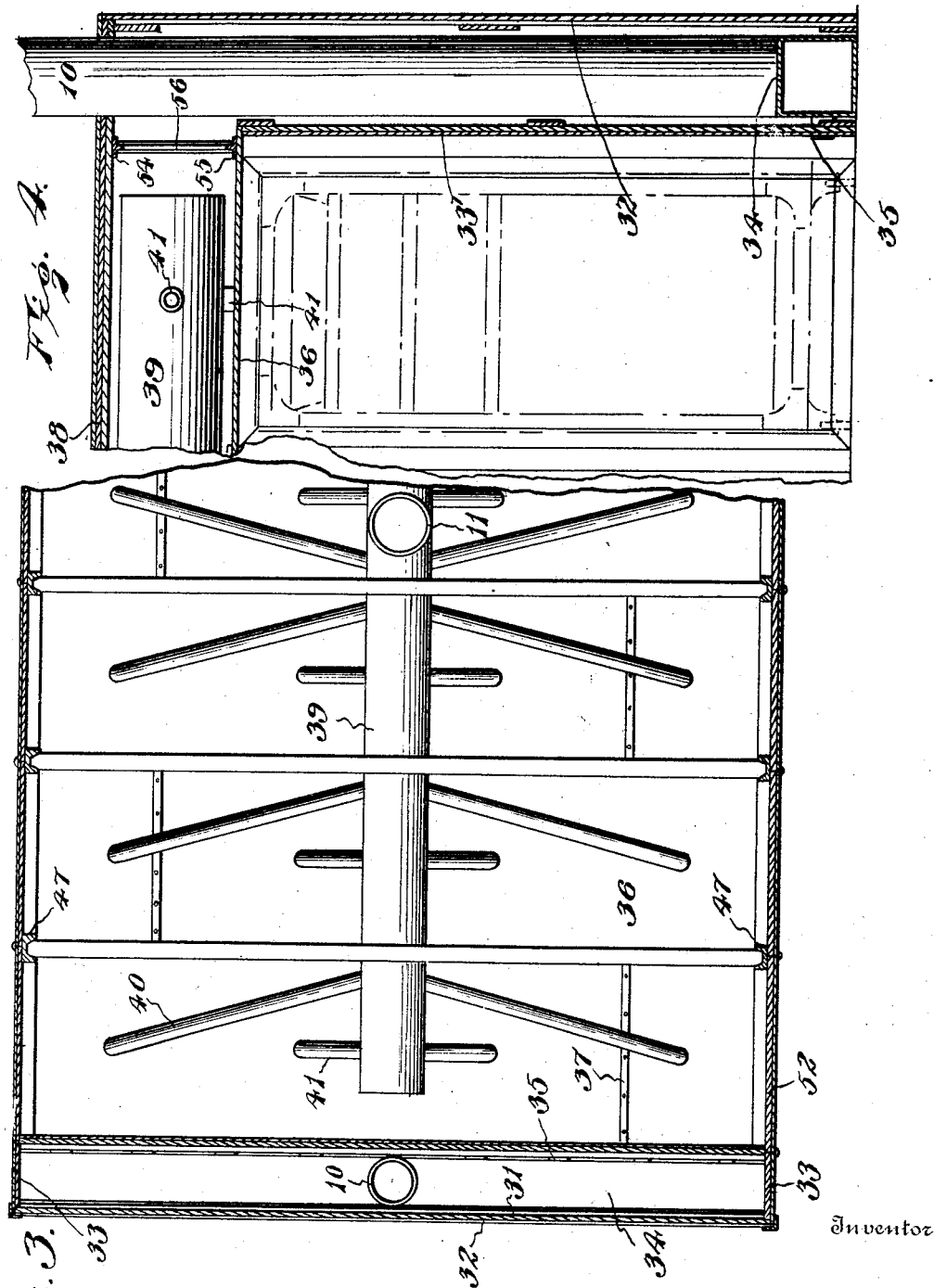

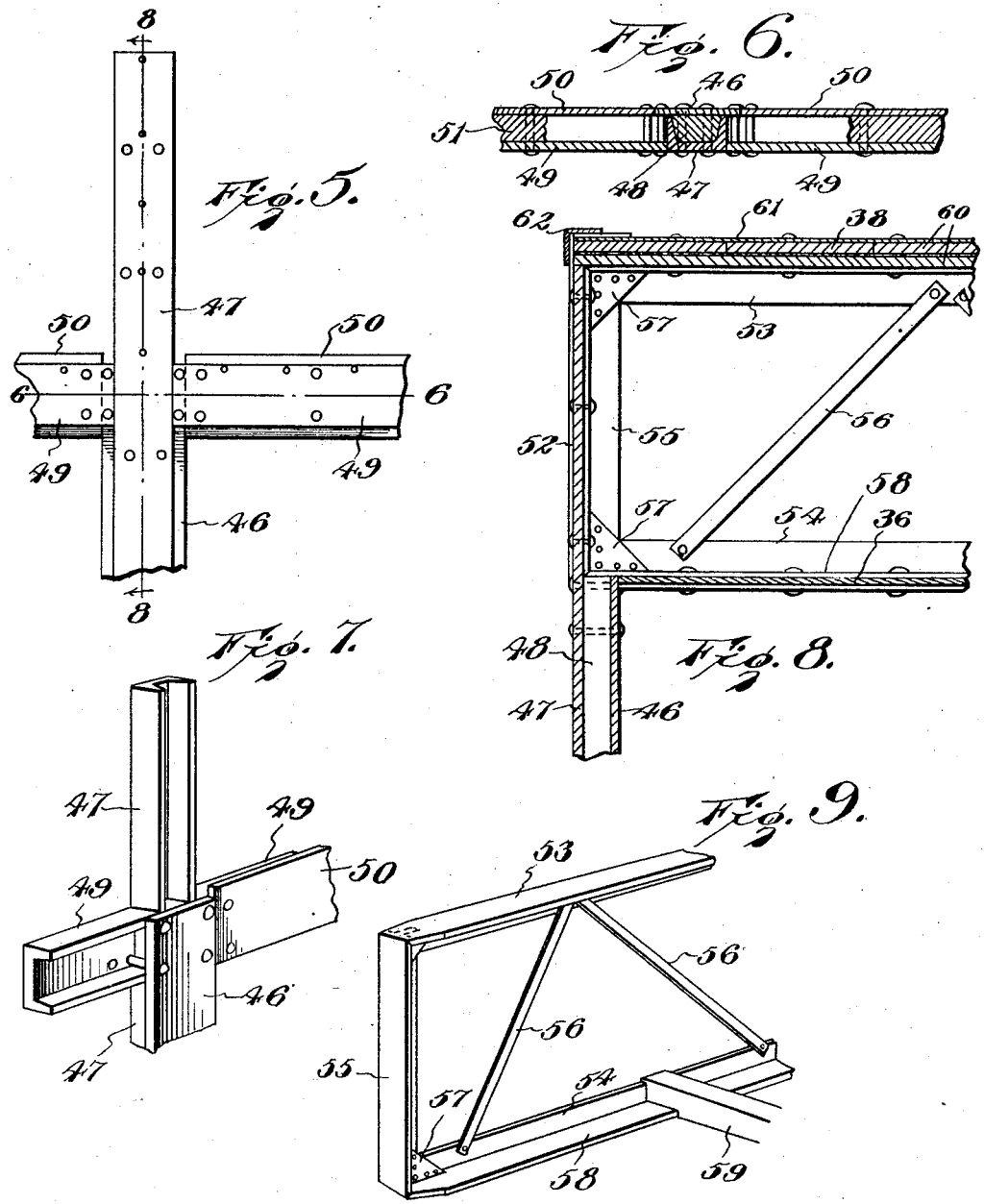

Patented June 2, 1931

1,807,688

UNITED STATES PATENT OFFICE

SANDER DEBUS, OF HASTINGS, NEBRASKA

DOUGHPROOFING APPARATUS

Application filed July 6, 1928. Serial No. 290,769.

This invention has for its object the provision of a dough-proofing apparatus in which there will be attained a constant circulation of warm moist air through a housing in which pans containing the dough are placed, the necessity for constant watching of the dough being obviated. The invention also has for its object the provision of an apparatus which may be built in sections and the sections duplicated to any desired extent according to the needs of a particular plant. Means are provided to automatically regulate the temperature and humidity, and means are also provided to permit convenient observation of the condition of the dough at all times without requiring the compartments containing the dough to be opened to admit comparatively cool air. The invention is illustrated in the accompanying drawings and will be hereinafter fully set forth.

In the drawings:

Figure 1 is a front elevation of an apparatus embodying the invention;

Fig. 2 is an enlarged transverse section on the line 2—2 of Fig. 1;

Fig. 3 is an enlarged view, partly in plan and partly in horizontal section, more particularly showing the arrangement of the return air conduits;

Fig. 4 is an enlarged longitudinal section of one end of the apparatus;

Fig. 5 is a detail elevation of a portion of the frame for supporting a door and a panel over a door;

Fig. 6 is a section on the line 6—6 of Fig. 5;

Fig. 7 is a detail perspective view of the joint shown in Fig. 5;

Fig. 8 is a detail section on the line 8—8 of Fig. 5;

Fig. 9 is a detail perspective of a portion of the truss shown in Fig. 8; and

Fig. 10 is a plan view of a portion of the air-circulating conduits.

In carrying out the invention, there is provided a housing including a plurality of sections, each of which is closed at its end by a door 1, a panel 2 being provided over each door. On the roof of this housing is mounted a casing 3 preferably supported by a platform 4 in spaced relation to the roof and equipped with a door 5 whereby access may be had to the interior of the casing when desired. A blower casing 6 communicates with the housing 3 at one side of the same through a nozzle or neck 7 and from one side of this fan casing extends an air conduit 8 having branches 9 extending to the ends of the main housing and depending into the same, as shown at 10. At the opposite side of the casing 3, a return air conduit 11 leads from the dough-proofing chambers into said casing 3, as will be understood. The fan or blower within the casing 6 may be of any approved standard construction and detail illustration of the same is unnecessary. It is driven by an electric motor, indicated conventionally at 12, current for which is supplied from trunk lines, indicated at 13, and controlled by a switch of any approved form, indicated conventionally at 14.

In the lower portion of the casing 3, there is provided a water pan or open top tank of any approved form, indicated at 15, and water to fill this tank is supplied through a water line 16 leading into the casing while an overflow pipe 17 leads therefrom to maintain the water at a substantially uniform level. Above the water pan or receptacle, a steam coil or radiator of any approved form is provided within the casing 3 and indicated at 18, steam being carried into this coil or radiator through a steam line 19 and carried therefrom back to the boiler (not shown) through a return steam line 20. A branch pipe 21 extends from the line 19 into the water pan so that steam may be discharged into the water to heat and vaporize the same. Cut-off valves 22 and 23 of any standard or approved construction are provided in the pipes 21 and 19, respectively, so that the flow may be nicely regulated. A humidostat, indicated at 24, of any approved form is provided in the water pan and so arranged that it will control the action of an ordinary pressure-controlled valve 25 disposed in the pipe 21 and thereby automatically establish or arrest flow of steam into the water according to the conditions within the heating and vaporizing compartment. A thermostat of any approved form, indicated at 26, is disposed in the upper portion of the dough-proofing compartments and is operatively connected with a pressure-controlled valve 27 so that the flow of steam into the heating chamber may be regulated according to the temperature of the proofing sections. I also provide a recording thermometer, indicated conventionally at 28, and a reading thermometer, indicated conventionally at 29, so that the temperature of the dough-proofing sections may be noted at any time and a record of the variations in the temperature over a definite period may be made.

In the upper portion of each door 1 is a window 30 whereby the condition of the dough in any section or compartment may be noted at any time without opening the door and thereby admitting chilled air to the dough.

The main housing of the apparatus comprises end walls each of which consists of an inner wooden frame, indicated at 31, and an outer sheathing of metal, indicated at 32. There are also end panels, indicated at 33, consisting of an inner wooden frame and an outer metal sheathing, this construction providing strength and facilitating the application of an attractive finish to the structure. There is also an inner end wall at each end of the apparatus which is spaced from the outer wall and may consist of a wooden frame and a metal sheathing, said inner wall being shown at 33′ in Fig. 4. The delivery ends 10 of the air conduit extend down between the respective inner and outer end walls and terminate in a transversely disposed hood 34 from the inner side of which nozzles 35 project through the inner wall to deliver the warm moist air into the interior of the housing. Extending between the upper edges of the inner end walls 33′ and between the front and rear of the housing is a ceiling 36 which, as shown most clearly in Fig. 3, may consist of metal plates having sealing strips 37 secured across their joints, where splicing of the plates is necessary, so that leakage of air through the ceiling will be avoided. Disposed between the ceiling 36 and the roof 38 is a longitudinally extending trunk line 39 from the sides of which extend a plurality of inlet pipes 40 and 41 having down-turned ends extending through the ceiling and opening within the several sections or compartments of the main housing whereby the warm moist air, after circulating through the several sections or compartments, may return to the heating and humidifying chamber on the roof of the apparatus. It will be noted that the pipes 40 and 41 are of somewhat contracted diameter and are of different lengths and each compartment has a pipe 40 and a pipe 41 in communication therewith, the pipes 41 receiving air from the compartment near the centers thereof and the pipes 40 taking air from the ends of the compartments. It will also be noted that the warm moist air is delivered into the compartments at the bottom of the same and, as it will naturally rise, it must pass around the dough placed in the compartments so as to act thereon before escaping through the return conduit. Inasmuch as the blower 6 is directly inserted in the air-circulating conduit, the flow of the air will be constant and steady and it will not be permitted to stagnate within the dough-proofing compartments.

Each door 1 comprises inner and outer layers or laminations of wood, as indicated at 42 in Fig. 2, metal sheathing 43 and 44 being applied to the faces of the wooden laminations so that a very strong door is produced and the air cannot readily penetrate the same. Channeled strips 45 are arranged around all the edges of the door so as to impart a neat finish thereto as well as strengthen the same. The doors are hung upon channel bars 47 across the inner open side of which are secured flat metal bars 46, a filler block 48 of wood being disposed within the channel of each bar 47 so as to insure rigidity of the plate 46, and the channel bar extending above the upper end of the plate so as to constitute part of the support for the panels above adjacent doors and also for the roof-supporting trusses which are disposed transversely of the apparatus between the roof and the ceiling. The tops of the door frames are provided by channel bars 49 having their channels presented to the upper end portions of the plates 46 and bolted or riveted to the projecting edges of the latter. Plates 50 are secured to the channels 49 so that their ends abut the side edges of the plates 46 at the upper ends thereof and their longitudinal edges project above and below the respective channels 49, and fillers 51 may be disposed between said plates and said channels. Panels 52 are provided over the respective doors and consist of plates bolted or otherwise rigidly secured to the projecting edges of the plates 50 and to the channels 47. The channel bars 47 are, of course, arranged in upright position at regular intervals and constitute division members between adjacent doors as well as supports for the doors, and the respective channels at the front and rear of the apparatus are transversely alined, as will be understood upon reference to Fig. 3. Extending between the alined channel bars 47 are trusses consisting of upper and lower T-bars 53 and 54 connected at their mitered ends by vertical T-bars 55 and having struts 56 secured to and extending therebetween at intervals, as will be understood. At the corners defined by the meeting of the bars 55 with the bars 53 and 54 are gusset plates 57 whereby a strong rigid joint is attained. The ends of the trusses fit within the channels of the upper projecting ends of the bars 47 and are riveted into the same while the lower members of the trusses rest upon the upper ends of the fillers 48 and the plates 46, as will be understood upon reference to Fig. 8. The ceiling 36 is bolted or riveted to the flanges 58 of the lower T-bars 54 and, if it should become necessary to splice the ceiling, girders 59 may be secured to and extend between adjacent T-bars 54 to provide a firm support for the ceiling at the splice. The roof 38 rests upon and is likewise secured to the upper T-bars 53 of the trusses and the roof may consist of wooden laminations 60 and a metal sheathing 61. Angle bars 62 are secured upon all the corners of the structure so as to impart an ornamental finish to the same as well as to reinforce the joints and guard against opening of the same.

Girders 63 are secured to and extend between alined door frames at the front and rear of the housing and brace the structure as well as mark off the several sections, it being understood that the sections or compartments are open to permit circulation of the proofing air.

The dough is placed in pans and the pans placed on racks which are rolled into place through the respective doors, as indicated by dotted lines in Figs. 2 and 4. It requires about forty minutes to raise bread in the proofing box. It is then ready for baking.

It will be readily seen that I have provided an exceedingly simple, strong, durable and easily erected apparatus whereby a circulation of warm moist air through several compartments containing dough will be attained and the apparatus may be easily erected in any desired size.

Having thus described the invention, I claim:

1. A dough-proofing apparatus comprising a housing, said housing having a ceiling and a roof with a chamber between the ceiling and the roof and also having inner and outer end walls, air heating and moistening mechanism mounted on the housing, an air conduit extending from said mechanism between the inner and outer end walls of the housing and provided with a plurality of nozzles discharging through the inner end walls, a return air conduit disposed between the ceiling and the roof of the housing and extending through the roof to the heating and moistening mechanism, and branch pipes extending laterally from said return air conduit and having their ends opening through the ceiling.

2. In a dough-proofing apparatus, a proofing compartment, a casing mounted on top of the proofing compartment, air heating and moistening mechanism within the casing, an air conduit extending from said casing into the proofing compartment, a return air conduit extending from the proofing compartment into said casing, means for delivering water into the heating and moistening mechanism, means for circulating steam through the heating and moistening mechanism, and means on the side of the proofing compartment for automatically regulating the flow of the steam according to the temperature and the humidity conditions within the proofing compartment.

In testimony whereof I affix my signature.
SANDER DEBUS. [L. S.]